United States Patent [19]
Lacey

[11] 3,747,976
[45] July 24, 1973

[54] SEATS
[75] Inventor: Robert Ronald Lacey, Northampton, England
[73] Assignee: Universal Oil Products Company, Des Plaines, Ill.
[22] Filed: Jan. 25, 1971
[21] Appl. No.: 109,105

[30] Foreign Application Priority Data
Jan. 30, 1970 Great Britain .................... 4,520/70

[52] U.S. Cl. .............................. 297/361, 297/366
[51] Int. Cl. ........................................ A47c 1/025
[58] Field of Search ................... 297/366, 362, 361, 297/355, 367, 378, 379, 372, 360, 359, 380; 5/74, 74 C

[56] References Cited
UNITED STATES PATENTS
| | | | |
|---|---|---|---|
| 572,773 | 12/1896 | Rockwell | 297/376 |
| 1,802,606 | 4/1931 | Krause | 5/74 |
| R6,180 | 12/1874 | Collins | 297/366 |
| 1,193,354 | 8/1916 | Brown | 5/74 C |
| 593,263 | 11/1897 | Willis | 297/362 |
| 1,788,801 | 1/1931 | Mintz | 297/360 |
| 3,044,830 | 7/1962 | Kolle | 297/361 |

FOREIGN PATENTS OR APPLICATIONS
1,053,599  1/1967  Great Britain .................... 297/366

Primary Examiner—Francis K. Zugel
Attorney—James R. Hoatson, Jr. and Philip T. Liggett

[57] ABSTRACT

A seat back adjustment means utilizing a pivoted arm between the seat part and the back part and a rack and pinion arrangement at one end of the arm connects to one of the parts to provide an effective change of length of the arm so as to thereby adjust the angle of the seat back. Preferably the rack is formed in a rear portion of an arcuate slot such that weight against the seat back tends to hold the teeth of a pinion member in the rack portion.

8 Claims, 7 Drawing Figures

INVENTOR:
Robert Ronald Lacey

BY: James R. Hoatson, Jr.
Philip T. Liggett
ATTORNEYS

INVENTOR:
Robert Ronald Lacey

BY: *James R. Hoatson, Jr.*
*Philip T. Liggett*
ATTORNEYS

SEATS

The present invention relates to seats, for example vehicle seats.

According to the present invention, there is provided a seat comprising a seat part, a back part pivotally connected to said seat part, an arm pivotally connected to one of said parts and displaceably connected to the other of said parts by a rack and pinion arrangement, the rack and pinion being so arranged that rotation of the pinion along the rack pivots said back part relative to said seat part and that the pinion is locked against rotation by a load applied by the rack.

Further according to the present invention, there is provided a seat comprising a seat part pivotally connected at its rear end to the lower end of a back part, an arm connected at one end to one of said parts and displaceably connected at its other end to the other of said parts by a rack and pinion arrangement, the pinion member of the rack and pinion arrangement being movable along the rack into a plurality of discrete positions so as to vary the inclination of the back part, and the rack being so inclined to the length of the arm that the pinion member is forced into locking engagement with the rack in a selected one of said discrete positions by the load applied to the back part when the seat is occupied.

Still further according to the present invention, there is provided a seat comprising a back part pivotally connected at its lower end to the rear end of a seat part, an arm pivotally connected to one of said parts and carrying a rack engaged with a pinion member mounted on the other of said parts for rotation only, the rack being positioned so that rotation of the pinion member is operable to vary the effective length of said arm and thereby pivot said back part relative to said seat part and so that the load on the back part when the seat is occupied acts to lock the pinion member in engagement with said rack.

Embodiments of the invention will now be described by way of example only with reference to the accompanying drawings, in which.

Figure 2:
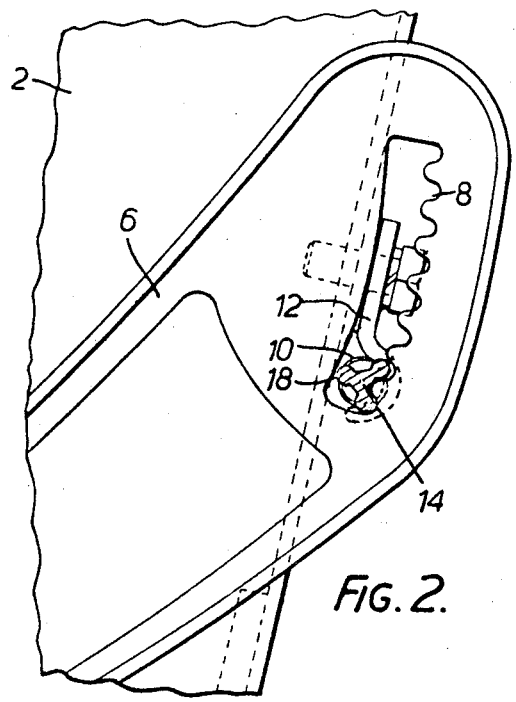
FIG. 2 is a fragmentary side elevation, to an enlarged scale, of an inclination adjustment mechanism of the seat shown in FIG. 1.
Figure 1:
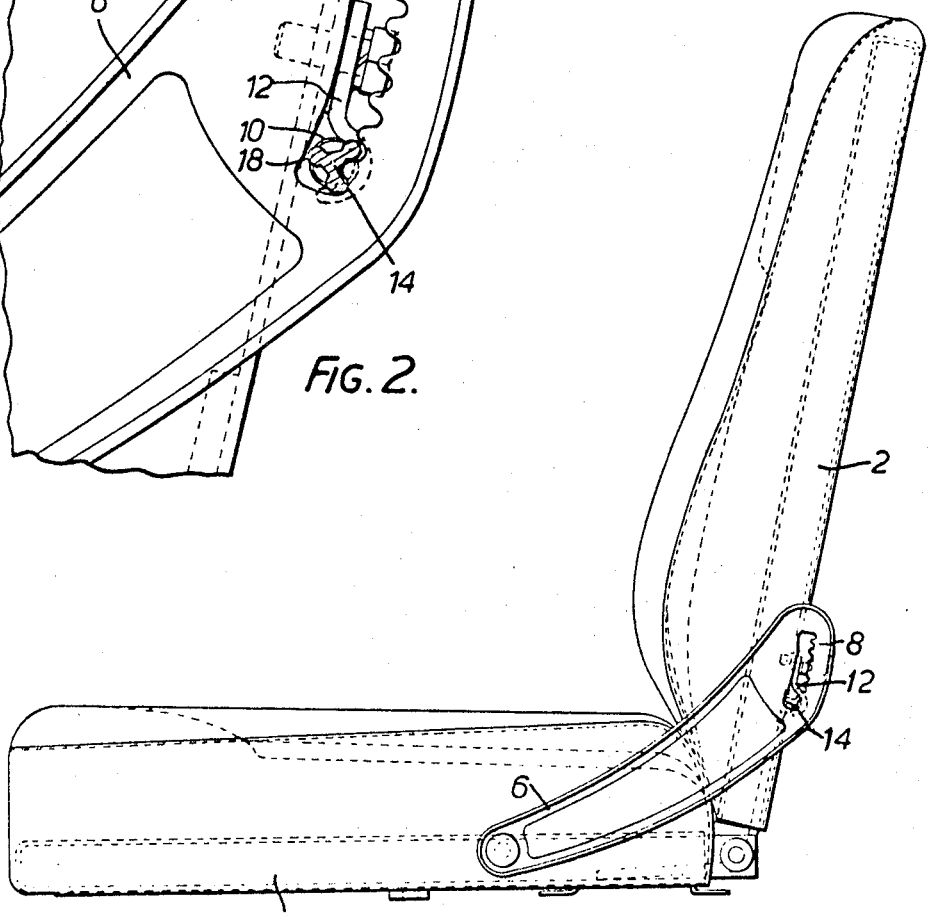
FIG. 1 is a side elevation of a first embodiment of a vehicle seat in accordance with the present invention.
Figure 3:
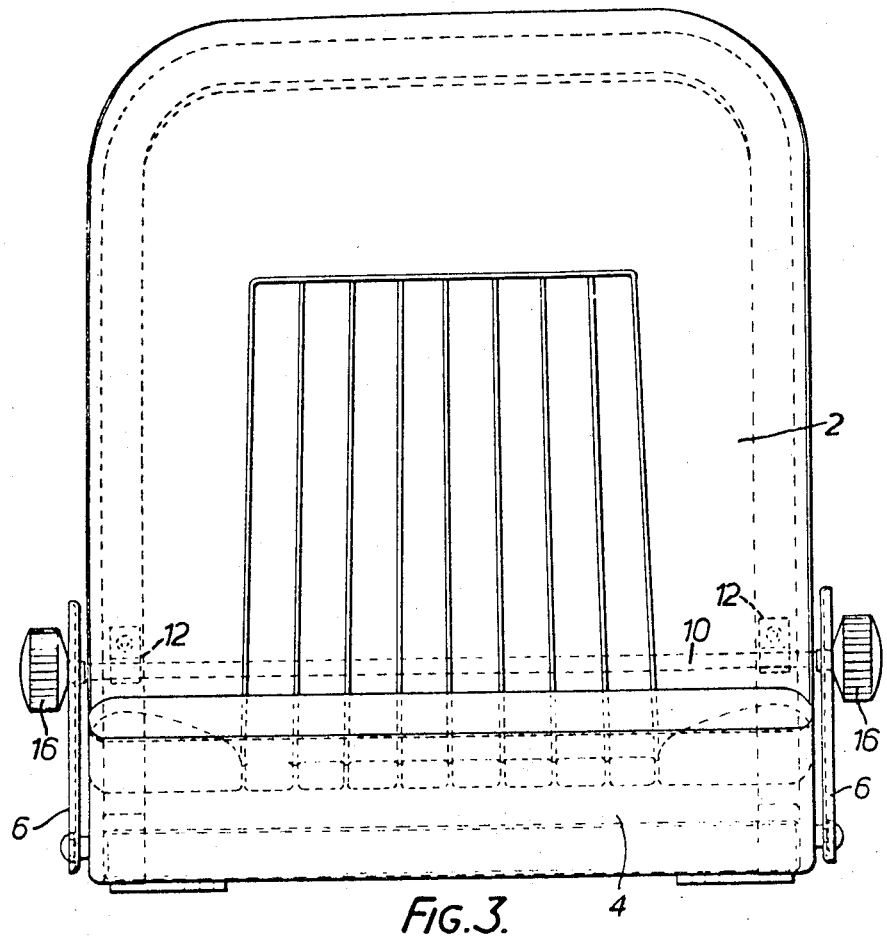
FIG. 3 is a front elevation of the seat shown in FIG. 1.
Figure 4:
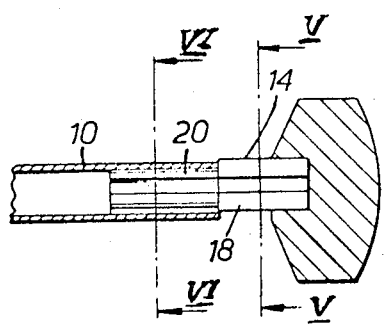
FIG. 4 is a fragmentary longitudinal section, to an enlarged scale, of an inclination adjustment shaft and pinion member of the mechanism shown in FIG. 2.
Figure 5:
FIG. 5 is a section taken on line V—V of FIG. 4.
Figure 6:
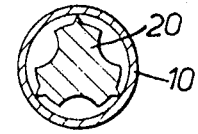
FIG. 6 is a section taken on line FI—VI of FIG. 4.

In the seat illustrated in FIGS. 1 to 6, the back part 2 of the seat is pivotally connected at its lower end to the rear end of the seat part 4 and is held at a chosen inclination relative to the seat part 4 by a pair of support arms 6 disposed at opposite sides of the seat. The forward lower end of each support arm 6 is pivotally connected to the seat part 4 and the rearward upper end of each support arm 6 is displaceably connected to the back part 2, the line through these connections lying at about 45° to the horizontal.

The displaceable connection is effected by providing a substantially vertically-extending and slightly concave forwardly facing rack 8 on the rearward end of each support arm, and mounting a tubular shaft 10 horizontally in bearings 12 on the rearward side of the back part 2, the ends of the shaft 10 carrying pinion members 14 each of which engages with a corresponding rack 8. An adjuster knob 16 (omitted from FIG. 2) is mounted over each of the pinion members 14 for rotation therewith, and by rotating either knob 16, the pinion members 14 are rotated relative to the racks 8, thereby raising or lowering the racks 8 and hence the support arms 6 and in consequence tilting the back part 2 forwards or backwards.

More particularly, the rack 8 is formed along the rear side of a parallel sided arcuate slot formed in the rear end of each support arm 6, and each pinion member 14 is formed by three partially cylindrical lobes 18 extending parallel to one another and equiangularly arranged about the axis of the shaft 10. The lobes 18 are dimensioned and spaced apart to permit two of the lobes 18 to engage simultaneously in two adjacent inter-tooth spaces of the rack 8, whilst the third lobe 18 lies adjacent to the forward side of the arcuate slot to take up substantially all of the slack between the pinion member 14 and the arcuate slot thus to obviate oscillation of the back part 2 when the seat is unoccupied. Rotation of the shaft 10 through 120° causes each pinion member 14 to move along its associated rack 8 by one rack tooth thereby altering the effective length of the support arm 6 and hence the inclination of the back part 2. In order to hold the pinion members 14 against the racks 8, the back part 2 of the seat is biased in a rearward direction. Each rack 8 is so inclined to the length of the arm 6 that, when the seat is occupied, the load on the back part 2 is effective to lock the pinion members 14 in engagement with their associated racks 8 and hence prevent inadvertent tilting of the back part 2.

The pinion members 14 are formed from sintered mild steel and include an integral spigot portion 20 which is a force fit within the end portion of the shaft 10.

Figure 7:
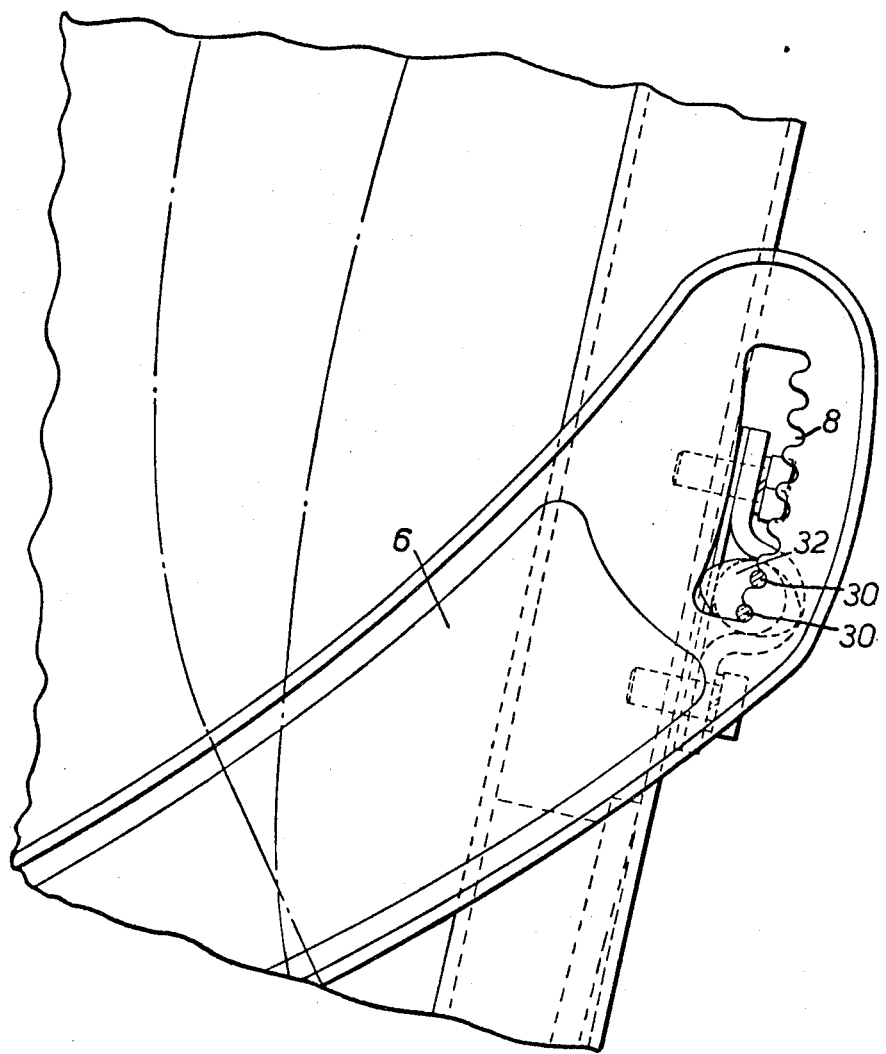
FIG. 7 is a fragmentary side elevation of a second embodiment of a vehicle seat in accordance with the present invention.

The embodiment illustrated in FIG. 7 is similar to the first embodiment with the exception of the pinion member which is formed by two pins 30 extending parallel to one another and to the axis of the shaft on opposite sides of the axis, the pins 30 being dimensioned and spaced apart to permit them to engage simultaneously in two adjacent inter-tooth spaces of the rack. Thus, rotation of the shaft and pinion members through 90° moves the back part slightly forwards, whereas further rotation through 90° brings each pinion member back to a new stable position spaced by one rack tooth from its previous position and permits the back part to pivot accordingly to take up its new inclined position. The slack between each pinion member and the forward edge of the corresponding slot is taken up by a substantially elliptical cam 32 whose minor axis intersects the axes of the shaft and the pins, the cam 32 sliding in engagement with a surface on the support arm parallel to, and laterally of, the slot in the support arm 6.

It will be evident that use of the particular form of pinion members described herein, avoids the need of a friction device for preventing unwanted rotation of the pinion members. Moreover, the rack and pinion device could alternatively by provided at the forward lower ends of the support arms, the pinion members of the device being journalled on the seat part.

I claim as my invention:

1. A seat with back adjustment means, comprising in combination, a seat part pivotally connected at its rear end to the lower end of a back part, a back part support arm pivotally connected at one end to one of said parts and displaceably connected at its other end to the other of said parts by a rack and pinion arrangement, the pinion member of the rack and pinion arragement being mounted on said other of said parts for rotation about an axis thereon and movable along a rack on said back part support arm into a plurality of discrete positions so as to vary the inclination of the back part, and the rack being so inclined to the length of the back part support arm that the pinion member is forced into locking engagement with the rack in any selected one of said discrete positions by the load applied to the back part when the seat is occupied.

2. The seat of claim 1 further characterized in that the rack is arcuate.

3. The seat according to claim 1 wherein the pinion member has at least two teeth for simultaneous engagement with respective teeth on the rack and abutment means engageable with the arm to substantially take up slack between the pinion member and rack when said two teeth are in simultaneous engagement with respective teeth on the rack.

4. The seat according to claim 3 still further characterized in that the rack is formed along one side of a parallel-sided slot in the arm, and the pinion member has three teeth, one of the teeth on the pinion member being in abutting engagement with the other side of the parallel-sided slot when the other of the teeth on the pinion member are in simultaneous engagement with respective teeth on the rack.

5. The seat according to claim 1 wherein the rack is formed on the arm and the pinion member has two teeth, each in the form of a pin, for simultaneous engagement with the rack, the pins extending parallel to one another and to the axis of the pinion member and being diametrically opposed about the axis of the pinion member.

6. The seat according to claim 5 comprising a substantially elliptical cam rigid with the pinion, the minor axis of the cam intersecting the axis of each pin and of the pinion member, the cam, when the pins are in simultaneous engagement with the rack, being arranged to bear against an abutment surface on the arm whereby to substantially take up slack between the pinion member and the arm.

7. A seat with back adjustment means, comprising in combination, a back part pivotally connected at its lower end to the rear end of a seat part a back part support arm pivotally connected at its forward end to said seat part and carrying at its rearward end a rack engaged with a pinion member mounted on the seat part for rotation only, the rack being positioned with its teeth facing in the general direction of the forward pivot connection of the arm but at varying distances therefrom so that rotation of the pinion member is operable to vary the effective length of said arm and thereby pivot said back part relative to said seat part and so that the load on the back part when the seat is occupied acts to lock the pinion member in engagement with said rack.

8. The seat according to claim 7 wherein a respective said arm is mounted adjacent each side of the seat, and a respective pinion member, one associated with each said arm, is mounted at each end of a shaft journalled on the other of said parts.

* * * * *